United States Patent [19]

Banucci et al.

[11] 4,163,030

[45] Jul. 31, 1979

[54] NOVEL POLYETHERAMIDE-IMIDE PHENOLIC RESIN BLENDS

[75] Inventors: Eugene G. Banucci, Scotia; Edith M. Boldebuck, Schenectady, both of N.Y.

[73] Assignee: General Electric Company, Schenectady, N.Y.

[21] Appl. No.: 921,366

[22] Filed: Jul. 3, 1978

Related U.S. Application Data

[62] Division of Ser. No. 628,330, Nov. 3, 1975.

[51] Int. Cl.² ............... C08L 63/00; C08L 71/00; C08L 77/00; C08L 79/00
[52] U.S. Cl. ........................... 525/429; 427/117; 427/185; 427/195; 428/458; 428/460
[58] Field of Search ............... 260/841, 857; 428/458, 428/460

[56] References Cited

U.S. PATENT DOCUMENTS

| | | | |
|---|---|---|---|
| 2,626,223 | 1/1953 | Sattler et al. | 260/841 X |
| 3,555,113 | 1/1971 | Sattler et al. | 260/841 |
| 3,567,673 | 3/1971 | Payette | 260/33.6 |
| 3,629,364 | 12/1971 | Soldatos | 260/838 |
| 3,647,919 | 3/1972 | Lee | 260/842 |
| 3,689,464 | 9/1972 | Holub et al. | 260/841 X |
| 3,763,272 | 10/1973 | Lee | 260/841 |
| 3,829,528 | 8/1974 | Aarna et al. | 260/841 |
| 3,847,867 | 11/1974 | Heath et al. | 260/47 CP |
| 3,847,869 | 11/1974 | Williams | 528/170 |
| 3,847,870 | 11/1974 | Takekoshi | 260/47 CP |
| 3,850,885 | 11/1974 | Takekoshi et al. | 260/47 CZ |
| 3,852,106 | 12/1974 | Incremona et al. | 260/841 X |
| 3,852,242 | 12/1974 | White | 260/47 CZ |
| 3,855,178 | 12/1974 | White et al. | 260/45.7 S |
| 3,932,344 | 1/1976 | O'Day et al. | 260/38 |

Primary Examiner—Thomas DeBenedictis
Attorney, Agent, or Firm—F. Wesley Turner; Joseph T. Cohen; Charles T. Watts

[57] ABSTRACT

This invention is concerned with a new class of polyetheramide-imide phenolic resin blends. More particularly, the invention is concerned with polyetheramide-imide phenolic resin blends which exhibit melt viscosities suitable for solventless-dry powder coating and curing of polyether-imide insulating films on various substrates. The polyetheramide-imide phenolic resin blends are also suitable for the manufacture of filaments, fibers, films, molding compounds, coatings, etc.

20 Claims, No Drawings

NOVEL POLYETHERAMIDE-IMIDE PHENOLIC RESIN BLENDS

This is a division of application Ser. No. 628,330, filed Nov. 3, 1975, copending.

BACKGROUND OF THE INVENTION

1. Field of the Invention

This invention is concerned with a new class of polyetheramide-imide phenolic resin blends. More particularly, the invention is concerned with polyetheramide-imide phenolic resin blends which exhibit melt viscosities suitable to solventless-dry powder coating and curing of polyether-imide insulating films on various substrates.

2. Description of the Prior Art

Solventless-dry powder coating materials which can be applied in the absence of pressure to various substrates to provide electrical insulation for materials employed in the manufacture of electrical items such as motors, coils, magnet wires, etc., are highly desired materials. The identification of thermosetting materials having the foregoing properties which sinter, flow, level and cure at elevated temperatures in the absence of pressure to form smooth, continuous substantially void-free film surfaces especially when employed in fluidized resin bed coating processes are especially desirable raw materials. Heretofore, insulating materials generally having the electrical characteristics associated with cured polyetheramide-imide resins, i.e. polyetherimides have not been available which permit the solventless-dry powder coating of electrical items in fluidized bed coating processes.

DESCRIPTION OF THE INVENTION

The novel compositions of our invention comprise polyetheramide-imide phenolic resin blends of the empirical formula

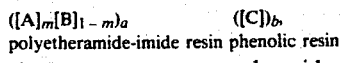

polyetheramide-imide resin phenolic resin wherein A represents a polyamide (polyamic acid) structural unit of the polyetheramide-imide resin, B represents a polyimide structural unit of the polyetheramide-imide resin, wherein the polymer mole fraction m represents a number greater than or equal to zero, preferably a number less than about 0.5, C stands for a phenolic resin, the resin blend proportion fraction a represents a number greater than zero, preferably a number greater than about 0.4 and less than 1, and more preferably greater than about 0.50 and less than about 0.95, and the sum of a plus b equals 1.0.

The A and B units of formula I comprise, herein and in the appended claims respectively, units of the following formulas:

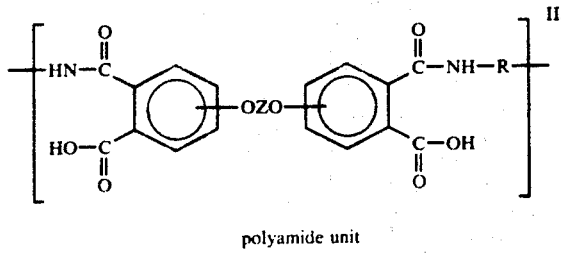

polyamide unit

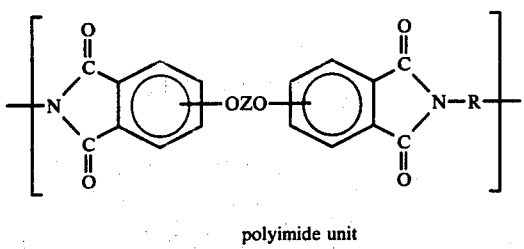

polyimide unit the O—Z—O units of the polyamide or polyimide units can be in the 3 or 3' or 4 or 4' positions e.g., the divalent bonds of the —O—Z—O— radical can be situated in the 3,3'-, 3,4'-, 4,3'-, or the 4,4'-positions and Z is a member of the class consisting of (1)

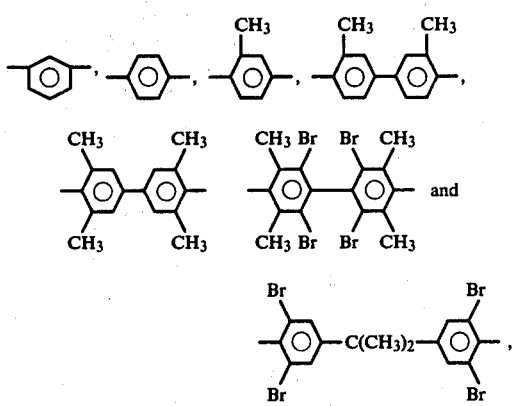

and (2) divalent organic radicals of the general formula

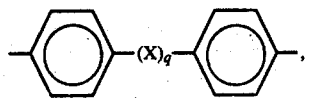

where X is a member selected from the class consisting of divalent radicals of the formulas

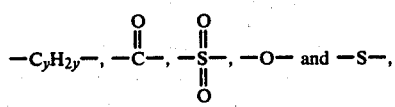

where q is 0 or 1, y is a whole number from 1 to 5, and R is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, $C_{(2-8)}$ alkylene terminated polydiorganosiloxane, and (c) divalent radicals included by the formula

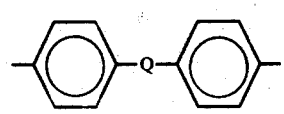

where Q is a member selected from the class consisting of

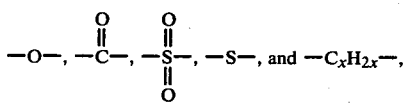

and x is a whole number from 1 to 5 inclusive.

As used herein and in the appended claims, it is to be understood that the polyetheramide-imide compositions employed in the invention can have any degree of amidization or imidization, which is generally determined by their methods of preparation well-known to those skilled in the art. Generally useful polyetheramide-imide compositions have an intrinsic viscosity $[\eta]$ greater than about 0.15 deciliters per gram, preferably from about 0.20 to about 0.35 deciliters per gram, or even higher as measured in N-methyl pyrrolidone (0.1 N in lithium bromide) at 25° C.

In general, the above-described polyetheramide-imide resins can be obtained by any of the methods well-known to those skilled in the art including the reaction of any aromatic bis(ether anhydride) of the formula

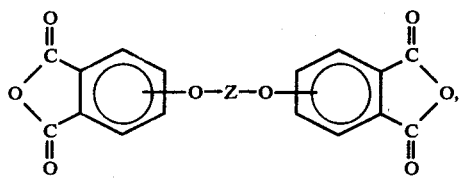

where Z is as defined hereinbefore with any diamino compound of the formula

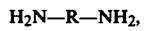　　　　　　　　　　(V.)

where R is as defined hereinbefore. Suitable methods include, in general, solution polymerization reactions that are advantageously carried out employing well-known solvents, e.g. tetrahydrofuran, o-dichlorobenzene/toluene mixtures, m-cresol/toluene mixtures, N-methyl pyrrolidone, dioxane/o-dichlorobenzene/toluene mixtures, N,N-dimethylformamide, etc., in which to effect interaction between the dianhydrides and the diamines at temperatures of from about 25° to about 60° C. Alternatively, the polyetheramide-imides can be prepared by melt polymerization of any dianhydride of Formula IV with any diamino compound of Formula V while heating a mixture of the ingredients at elevated temperatures with concurrent intermixing. Generally, melt polymerization temperatures between about 180° to about 350° C. preferably about 185° to about 300° C., and more preferably from about 190°–210° C. are employed. Any order of addition of chain stoppers ordinarily used in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed, however, a slight molar excess (about 1 to 10 mol percent) of an aliphatic or aromatic dianhydride or (about 1 to 10 mol percent) of an aliphatic or aromatic diamine can be employed in order to effect the production of polyetheramide-imides having terminal anhydride or amine groups, respectively.

Included among the many well-known methods of making polyetheramide-imides that can be employed in the practice of this invention are those disclosed in Heath et al. U.S. Pat. No. 3,847,867, Williams U.S. Pat. No. 3,847,869, Takekoshi et al. U.S. Pat. No. 3,850,885, White U.S. Pat. Nos. 3,852,242, and 3,855,178, etc. These disclosures are incorporated herein in their entirety by reference for the purpose of teaching, by way of illustration, general and specific methods for preparing poyetheramide-imides suited to the practice of this invention.

The aromatic bis(ether anhydride)s of Formula IV include, for example, 2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)-diphenyl-2,2-propane dianhydride; etc., and mixtures of such dianhydrides.

Additional aromatic bis(ether anhydride)s also include Formula IV are shown by Koton, M. M.; Florinski, F. S.; Bessonov, M. I.; Rudakov, A. P. (Institute of Heteroorganic Compounds, Academy of Sciences, U.S.S.R.), U.S.S.R. 257,010, November 11, 1969, Appl. May 3, 1967, and by M. M. Koton, F. S. Florinski, Zh Org. Khin. 4 (5), 774 (1968).

The organic diamines of Formula V include, for example, m-phenylenediamine,
p-phenylenediamine,
4,4'-diaminodiphenylpropane,
4,4'-diaminodiphenylmethane,
benzidine,
4,4'-diaminodiphenyl sulfide,
4,4'-diaminodiphenyl sulfone,
4,4'-diaminodiphenyl ether,
1,5-diaminonaphthalene,
3,3'-dimethylbenzidine,
3,3'-dimethoxybenzidine,
2,4-bis($\beta$-amino-t-butyl)toluene,
bis(p-$\beta$-amino-t-butylphenyl)ether,
bis(p-$\beta$-methyl-o-aminopentyl)benzene,
1,3-diamino-4-isopropylbenzene,
1,2-bis(3-aminopropoxy)ethane,
m-xylylenediamine,
p-xylylenediamine,
2,4-diaminotoluene, 2,6-diaminotoluene,
bis(4-aminocyclohexyl)methane, 3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine,
decamethylenediamine,
bis(3-aminopropyl)tetramethyldisiloxane,
bis(4-aminobutyl)tetramethyldisiloxane, etc., and mixtures of such diamines.

The phenolic resins of the C units of Formula I, herein and in the appended claims, comprise phenolic compounds commonly referred to by those skilled in the art as oil soluble thermoplastic phenolic resins prepared from the reaction of phenols and aldehydes under acidic or basic catalyzed reaction conditions.

In general, the acidic catalyzed phenolic resins are commonly referred to as "novolac" resins, i.e. resins prepared under conditions which employ less than one mole of aldehyde per mole of phenol. In general, the phenol reactants are preferably bifunctional reactants, i.e. phenols that are substituted in an ortho or para position which polymerize to form substantially linear phenolic resins that contain from 2 to 20 phenol rings or more. In general, the phenolic resins described herein are limited to phenolic resins having an average molecular weight in excess of 125-150. Preferably, the molecular weight is within the range of from about 350 to 1,000, or even higher, for example 5,000 or more.

The phenolic resins which are employed in the practice of this invention are well-known to those skilled in the art. Methods for their preparation and characterization are also well-known and are set out in various well-known publications, e.g. Encyclopedia of Polymer Science 10, pages 1-73, entitled *Phenolic Resins* and *The Chemistry of Phenolic Resins* by R. W. Martin, copyrighted 1956, published by John Wiley and Sons, Inc., Library of Congress Catalog, Card No. 56-5711, as well as in numerous U.S. patents and other literature sources described and recited in the aforementioned reference publications.

In theory, not intended to limit this invention in any way, a highly idealized novolac resin molecule—made by the condensation of phenol with formaldehyde wherein the resin is phenol-ended—is illustrated by the following formula wherein the phenolic nuclei are joined by methylene bridges located ortho and para to phenolic hydroxyl groups:

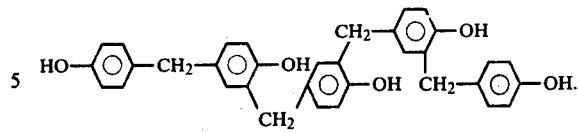

In general, commercial oil soluble thermoplastic phenolic resins are almost invariably prepared with acidic catalysts, however oil soluble thermoplastic phenolic resins prepared under noncatalyzed or even base catalyzed reaction conditions can also be employed in this invention. The phenols most commonly employed are phenol, resorcinol, and alkyl-substituted phenols, e.g. cresols, xylenols, para-tertiary-butylphenol, para-tertiary-amylphenol, para-phenylphenol, etc. The aldehyde most commonly employed is formaldehyde, almost exclusively, although small amounts of acetaldehyde and furfuraldehyde can also be used. As is well-known to those skilled in the art, formaldehyde is sometimes used in the form of its polymer, paraform, as a dry powder. In the practice of this invention, preferably, the phenolic resins have a melting point range of from about 40° to about 200° C., more preferably from about 60° to about 125° C.

In a preferred embodiment of this invention, it is preferred that the phenolic resins be prepared substantially from phenols having para substituents, more preferably tertiary acyclic or cyclic hydrocarbon groups, i.e., groups free of hydrogen atoms associated with the carbon atom directly bonded to a ring carbon atom, e.g. tertiary alkyl or tertiary alkylene substituents even more preferably having from 4 to 30 carbon atoms, such tertiary butyl, tertiary amyl groups, etc. In addition to the novolac resins described hereinbefore which are permanently soluble and cure only upon the addition of a curing agent, it is to be understood that the phenolic resins employed in the practice of this invention, although less preferred than the novolac resins, can be "resole" resins, i.e. resins prepared under conditions which employ more than one mole of aldehyde per mole of phenol, subject to the proviso that the resole resins employed have limited amounts of reactive methylol —$CH_2OH$ groups. In general, the resole resins that can be employed in the practice of this invention can have a methylol content, on a weight basis, of less than about 10%, preferably less than about 5% and even more preferably less than about 1% based on total weight of the phenolic resins, since phenolic resins which possess reactive methylol groups are heat reactive, i.e. are capable of being cured by the application of heat and acids, which cure results from the condensation of the methanol groups associated with the phenolic moiety.

In the preparation of the polyetheramide-imide resin phenolic resin compositions of this invention which are suitable for solventless-dry powder coatings, it is essential that the coatings be prepared from blends that are homogeneous. In general, the polyetheramide-imide phenolic resins are combinable with each other in all proportions. However, in the use of the compositions of this invention in the manufacture of electrical insulation systems for motors, coil or magnet wires (wire for magnetic coils), etc., it is preferred that the compositions contain at least 40% by weight polyetheramide-imide and preferably more often at least 75% polyetheramide-imide because of the outstanding electrical properties contributed by the polyetheramide-imide component of solvent-free PEAI-phenolic resin compositions.

In general, the polyetheramide-imide phenolic resin blends of this invention in pulverulent form are particularly suited to the continuous coating of wire substrates employing fluidized bed coating techniques. They are especially useful in fluidized bed coating methods which coat wire substrate by passing the wire through a cloud of electrostatically charged particles of polyetheramide-imide phenolic resins suspended above the upper surface of a fluidized bed of a PEAI-phenolic resin powder contained within a coating chamber. Subsequent passage of the electrostatically coated wire to another chamber at temperatures elevated from that of the coating chamber wherein the polyetheramide-imide phenolic resins are sintered, flowed, leveled and cured into the uniform coating essentially free of voids—provides excellent insulated wire coatings.

In general, in the solventless-dry powder coating applications employing the novel compositions of this invention, the following powder characterizations are generally found to be desirable—and often essential—to the economic utilization of the resin blends of this invention. In brief, the suitability of the polyetheramide-imide phenolic resin compositions to solventless-dry powder coating requires consideration of the folloing factors:

Average Particle Size (APS)
Sintering Temperature Range (STR)
Viscous Flow Temperature Range (VFTR)
Leveling Temperature Range (LTR)
Optimum Cure Time and Temperature Range (OCTTR)

With regard to Particle Size, as used herein and in the appended claims, the resin powders when employed in insulating wire processes generally comprise particles having a diameter or from about 5 to about 200 microns ($\mu$) and preferably from 5 to 60 microns for coatings up to 3 mils in thickness.

With regard to Sintering Temperature Ranges, as used herein in the appended claims, the resin powder sintering temperatures are defined as the lowest temperature in degrees centigrade (°C.) at which solvent-free polyetheramide-imide phenolic resin powders—hereinafter sometimes referred to for brevity as resin powders—having the particle size limitations set out hereinbefore show adherence to themselves and to a substrate, but show no significant viscous flow or leveling. In general, the "STR" for solventless-dry powder coatings are within the range of from about 75° to about 200°, preferably from about 140° to about 190° C. In general, the "STR" of any resin powder can be readily determined and reproduced within ±5° C. accuracy by simple laboratory procedures described elsewhere in this specification.

With regard to Viscous Flow Temperature Range, as used herein and in the appended claims, viscous flow temperatures are defined as the lowest temperature in degrees centigrade (°C.) at which individual polymer particles lose all angularity and show a rounded or uniform curved surface at the air-melt interface—usually resembling a hemispherical droplet with the largest cross-section at a substrate-melt interface. The viscosity of the melt of the resin powders within the "VFTR" is in the order of $10^4$ to $10^5$ poise at zero or low shear (0.025 sec.$^{-1}$). In general, the polymer powders heated at the viscous flow temperature will form a film but will not necessarily flow out to form a completely smooth surface.

In general, the resin powder which exhibits viscous flow, as defined above, is suitable for production of coatings of thickness greater than about 2 mils. A resin powder which becomes fluid enough to show "leveling" before cure is well-adapted for production of high quality thin-film coatings in the order of 1 to 2 mils, as well as thicker films.

In general, the "VFTR" for solventless-dry powder coatings are within the range of from about 75° to 240°, preferably from about 155° to about 220° C. In general, the "VFTR" of any resin powder can also be readily determined and reproduced within ±5° C. accuracy by simple laboratory procedures also described elsewhere in this specification.

With regard to the Leveling Temperature Range, as used herein and in the appended claims, "LTR" is defined as the lowest temperature at which a resin powder flows and flattens to give a thin film with a glossy surface wherein a group of resin particles coalesce to form a flat upper surface and exhibit an obvious curvature at the contact angle surrounding a periphery of a coalesced resin powder.

In general, the "LTR" for solventless dry powder coatings are within the range of from about 160° C. to 280° C., preferably from 200° C. to 250° C. In general, the "LTR" of any resin powder can also be readily determined and reproduced within ±10° C. accuracy by simple laboratory procedures also described elsewhere in this specification.

In general as defined above, resin powders which exhibit average particle size, sintering temperature range, viscous flow temperature, and leveling temperature characteristics are suitable solventless-dry powder insulating coating materials.

Summarily, finely divided resin powders as characterized hereinbefore coalesce at temperatures below the melting point of the polyetheramide-imide resin component of the resin powders and cure into solid, homogeneous cured coatings under the influence of heat and in the absence of pressure.

In general, any method well known to those skilled in the art can be employed in the preparation of the homogeneous resin powders of this invention, including the preparation of a homogeneous admixture of polyetheramide-imide resins and phenolic resins employing either solution or melt mixing techniques for the preparation of a homogeneous uniform mixture. In general, homogeneous uniform admixtures can be prepared by dissolving the polyetheramide-imide resin and solid phenolic resins in a suitable solvent such as tetrahydrofuran, dichlorobenzene, m-cresol, toluene, formamide, N-methylpyrrolidone, dioxane/ortho-dichlorobenzene toluene mixtures, N,N-dimethylformamide, etc., in which to affect a true solution between the polyetheramide-imide and phenolic resins, at temperatures of from about 25° to about 100° C. The homogeneous solutions can be spray-dried to form polymer resins of the desired particulate size, or alternatively the homogeneous blend of polymers can be precipitated from the solvent by using a suitable nonsolvent such as water or hexane in which to affect precipitation of the homogeneous blend of resins having a suitable particle size after drying and grinding by any suitable means. Alternatively, the polyetheramide-imides and liquid or solid phenolic resins can be melt blended and extruded with concurrent mixing at elevated temperatures, e.g. within the temperature range of from about 170° to about 350° C. The resulting extrudate can be prepared in a particulate form by any suitable method such as grinding, spray drying, precipitation from non-solvents, etc.

In addition to the polyetheramide-imide resin and phenolic resin components of the resin powders, other ingredients can be included in the resin powders which inclusion may assist in providing solvent-free polymer powders that sinter, flow, level and cure into coherent films—other fillers which are nondeleterious to the characteristics of electrical insulating resin powders can also be included, e.g. nonmetallic fillers, such as particulate polytetrafluoroethylene resin, asbestos, clay, mica, vermiculite, kaolin, fumed silicas, titanium dioxide and other optional fillers or ingredients, e.g. plasticizers, flexibilizers, stabilizers, surfactant agents, pigments, dyes, reinforcements, flame retardants, diluents, and mixtures thereof, etc. In nonelectrical applications, fillers which are often deleterious to the characteristics of electrical insulating resin powders can also be included, e.g. silicon carbide, molybdenum disulfide, cryolite, boron nitride, iron sulfide, metal carbides, metal oxides, carbon fibers, graphite, powdered metals such as aluminum, copper and the like. In addition to the other fillers or ingredients noted herein-before, conventional curing agents for phenolic resins well-known to those skilled in the art which enhance certain properties of the resin powders, e.g. cut-through temperatures, may be used if desired.

The following examples illustrate—but do not limit—the best mode of practicing the invention to a person skilled in the art.

Unless otherwise indicated in the examples, the following general procedures were employed in the preparation and testing of the polymer powders of this invention. Any deviations from the general procedure is noted in the specific examples.

General Procedure

Polyetheramide-imide Resins

A series of resin powders were prepared employing polyetheramide-imide resins—characterized by dianhydride and diamino reactants—having an intrinsic viscosity, [$\eta$] 0.2–0.6 dl./gm. at 25° C., measured in chloroform or N-methylpyrrolidone (NMP) depending upon the degree of imidization and a glass-transition temperature $T_g$ of 140°–225° C. The polyetheramide-imide resins were prepared in accordance with the procedures described in U.S. Pat. No. 3,850,885 which procedures are incorporated herein by reference in their entirety.

Phenolic Resins

The phenolic resins employed in the preparation of the resin powders were commercially available materials, e.g., Union Carbide Company's CKM-2103, an oil-soluble novolac resin prepared from a para-tertiary-butylphenol and formaldehyde having a softening point within the range of from about 100° to 120° C. (215°–245° F.) and a specific gravity range of 1.06 to 1.08; CKM-0036, a novolac resin prepared from a para-tertiary-amylphenol and formaldehyde having a softening point of range of from 85° to 100° C. (185°–210° F.) and a specific gravity range of 1.04 to 1.06; CKM-1282, a resole phenolic resin prepared from the reaction of paratertiary-butylphenol and formaldehyde having a softening point range of from 82° to 100° C. (180°–210° F.) and a specific gravity range of 1.10 to 1.12; CKM-1634, an oil-soluble resole resin having a softening point range of from 88° to 105° C. (190°–220° F.) and a specific gravity range of 1.09 to 1.11; and CKM-1636, an oil-soluble resole resin having a softening point range of from 105° to 127° C. (220°–260° F.) and a specific gravity range of 1.09 to 1.11.

Sintering, Viscous Flow, Leveling Temperatures

The sintering, viscous flow, and leveling temperatures for the resin powders were determined according to the following test sequence. A series of solvent-free powder portions having an average particle size of 200 microns or less (0.1 to 0.5 mg.) were sprinkled onto preheated glass slides resting on temperature gradient blocks at temperature intervals of about 5° C. over a temperature range of from about 130° to about 250° C. After 5 minutes, the glass slides were removed from each temperature gradient block position, allowed to cool at room temperature and the polymer particles were examined with a stereoscopic microscope at 45× magnification. The temperatures at which the polymer particles reached their sintering temperature, viscous flow temperature or leveling temperature as defined elsewhere in this specification were recorded.

Various resin powders in addition to being evaluated under sintering, viscous flow, and leveling characterization were also evaluated for cut-through temperature, dissipation factor, initial flexibility after cure, and thermal flexibility life according to the following test procedures.

Cut-Through Temperatures

Unsupported films of resin powders having a uniform thickness of less than about 3 mils were prepared and were cured, generally, for 15 to 30 minutes at 300° C.

The cured films were tested by placing a small piece of the cured film between two bare copper wires crossed at a 90° angle in a cut-through apparatus commonly employed by the electrical industry in the evaluation of enameled magnet wire J.A.N.-W-583 (Apr. 7, 1948). The copper wires were electrically insulated from a metal base plate by 5 mil mica sheet. The cut-through temperature of the cured film was determined by placing the test apparatus in an air circulating oven with the copper wires connected to 110 volt AC circuit which contained an alarm system. A 1000 gram load was placed on the upper copper wire - crossed wire pair. The loaded film resting between the crossed wires was heated in an air circulating oven at a rate of about 10° C. per minute and the temperature was recorded at which the film flowed enough to permit electrical contact between the wires, thus activating the alarm system.

Dissipation Factor

Cured resin powders in the form of films were tested for the property described as dielectric dissipation factor which is defined herein as the "dielectric dissipation factor, loss tangent" and which is related to the heat produced in an electrically insulating material under imposed voltage. The electrical insulating quality of a film is dependent on its ability to retain a low dissipation factor at the maximum temperature of use.

The tests were performed accordingly. Cured resin powder film was clamped between two circular brass discs of 1.25" diameter which served as electrodes. The film with attached electrodes was immersed in a number 10 C Transformer Oil and the dissipation factor was read on a capacitance test bridge of standard type capable of measuring directly the dissipation factor of a film in the range from 0 to 0.5 at 60 hertz. The oil was slowly raised in temperature and additional dissipation factor values were measured at a series of temperatures between 120° and 220° C.

Initial Flexibility

Flexibility of cured resin powder film was determined by a simple 180° bend test accordingly. Cured resin films of 3 mil thickness were tested for acceptable flexibility by a test described as "bend and crease" in which a film is folded over on itself to a 180° angle and the fold is then creased by normal pressure from the fingers. A film is considered to have adequate flexibility if it does not crack or break into two pieces in this test.

Thermal Flexibility Life

Cured resin films were measured for their resistance toward embrittlement at 300° C. Strips of 3 mil film were heated in an air circulating oven maintained at 300° C. The films were withdrawn periodically and cooled to room temperature and then tested for flexibility by the above-mentioned bend and crease test. By this procedure the approximate time at 300° C. required to produce enough embrittlement so that the thermally aged film would break into two pieces in the bend and crease test was determined and recorded.

EXAMPLE I

This example illustrates the reduction in the sinter, viscous flow and leveling properties of polyetheramide-imide phenolic resins which are suitable for dry powder coating applications. Set out in Table I hereafter is a summary of the proportions by weight of anhydride-capped polyetheramide-imide resin and phenolic resin, the sintering temperature, the viscous flow temperature and the leveling temperature of the various blends.

TABLE I

| Run Nos. | Phenolic Type | BPADA:MDA[1] PEAI Type | Weight Ratio Phenolic:PEAI | Melt Character °C. | | |
|---|---|---|---|---|---|---|
| | | | | Sinter | Viscous Flow | Leveling |
| 1A | CKM 2103 | 5% x's BPADA[2] | 50:50 | 135 | 150 | 165 |
| 1B | " | " | 25:75 | 180 | 200 | 225 |
| 1C | " | " | 15:85 | 190 | 225 | >250 |
| 1D | " | " | 5:95 | 195 | 235 | >250 |
| 1E | " | " | 0:100 | 225 | >250 | >250 |
| 2A | CKM 2103 | 10% x's BPADA[3] | 50:50 | 130 | 150 | 195 |
| 2B | " | " | 25:75 | 195 | 235 | 235 |
| 2C | " | " | 15:85 | 215 | >235 | >250 |
| 2D | " | " | 5:95 | 220 | >235 | 235 |
| 2E | " | " | 0:100 | 205 | 235 | >250 |
| 1F | CKM 1282 | 5% x's BPADA | 50:50 | 140 | 185 | 215 |
| 2F | " | " | 25:75 | 160 | 195 | 225 |
| 1G | CKM 1282 | 10% x's BPADA | 50:50 | 150 | 200 | (4) |
| 2G | " | " | 25:75 | 160 | 220 | (4) |

[1]BPADA = Bisphenol A dianhydride, i.e. 2,2-bis[4-(3,4-dicarboxy phenoxy)phenyl] propane, having the structural formula:

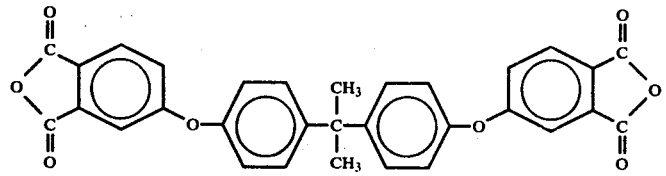

MDA = Methylene dianiline having the structural formula: $H_2N-\phenyl-CH_2-\phenyl-NH_2$

[2]Intrinsic viscosity of the 5% excess BPADA polymer was .48 dl./g. as measured in NMP at 25° C.
[3]Intrinsic viscosity of the 10% excess BPADA polymer was .37 dl./g. as measured in NMP at 25° C.
[4]Cured before leveling As illustrated by the above examples, the sinter, viscous flow, and leveling characteristics, primarily the viscous flow and sinter characteristics of the polymer powders are significantly decreased in value as the amount of phenolic resin increases in relationship to the amount of anhydride-capped polyetheramide-imide resin contained in the combination.

EXAMPLE II

This example illustrates the reduction in the sinter, viscous flow and leveling properties of polyetheramide-imide phenolic resins which are suitable for dry powder coating applications. Set out in Table II hereafter is a summary of the proportions by weight of amine-capped polyetheramide-imide resin and phenolic resin, the sintering temperature, the viscous flow temperature and the leveling temperature of the various blends.

TABLE II

| Run Nos. | Phenolic Type | BPADA:MDA[1] PEAI Type | Weight Ratio Phenolic:PEAI | Melt Character °C. | | |
|---|---|---|---|---|---|---|
| | | | | Sinter | Viscous Flow | Leveling |
| 1H | CKM 2103 | 15%x's MDA[2] | 50:50 | 175 | 200 | 220 |
| 1I | " | " | 25:75 | 180 | 220 | (4) |
| 1J | " | " | 15:85 | 195 | 235 | " |
| 1K | " | " | 5:95 | 200 | 240 | " |
| 1L | " | " | 0:100 | 220 | 235 | " |

TABLE II-continued

| Run Nos. | Phenolic Type | BPADA:MDA[1] PEAI Type | Weight Ratio Phenolic:PEAI | Melt Character °C. | | |
|---|---|---|---|---|---|---|
| | | | | Sinter | Viscous Flow | Leveling |
| 2H | CKM 2103 | 20%x's MDA[3] | 50:50 | 160 | 175 | 195 |
| 2I | " | " | 25:75 | 180 | 200 | 220 |
| 2J | " | " | 15:85 | 195 | 220 | 227 |
| 2K | " | " | 5:95 | 200 | 230 | 240 |
| 2L | " | " | 0:100 | 215 | 220 | 225 |

[1]BPADA = Bisphenol A dianhydride, i.e. 2,2-bis[4-(3,4-dicarboxy phenoxy)phenyl] propane, having the structural formula:

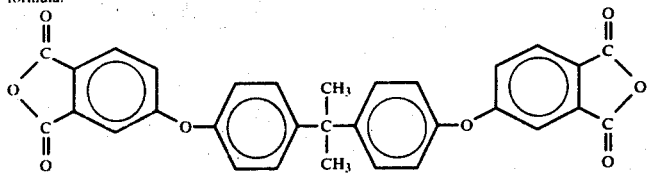

MDA = Methylene dianiline having the structural formula:

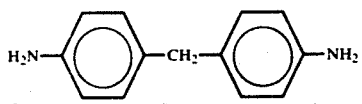

[2]Intrinsic viscosity of the 15% excess MDA polymer was 0.394 dl./g. as measured in NMP @ 25° C.
[3]Intrinsic viscosity of the 20% excess MDA polymer was 0.313 dl./g. as measured in NMP @ 25° C.
[4]Cured before leveling As illustrated by the above examples, the sinter, viscous flow and leveling characteristics, primarily the viscous flow and sinter characteristics of the polymer powders are significantly decreased in value as the amount of phenolic resin increases in relationship to the amount of amine-capped polyetheramide-imide resin contained in the combinations.

EXAMPLE IV

A series of polyetheramide-imide phenolic resin blends were prepared and the resulting properties of the resulting resin powders after formation into cured films were characterized, as set out in Table III, according to cut-through temperature °C., dissipation factor at 220° C., and initial flexibility.

TABLE III

Physical Properties of Various Polyetheramide-imide - Phenolic Resin Blends

| Run Nos. | Phenolic Type | Curing Agent[1] | BPADA:MDA[2] PEAI Type | Weight Ratio Phenolic PEAI | Cut-through Temperature °C.[3] | | Dissipation Factor[4] | Flexibility |
|---|---|---|---|---|---|---|---|---|
| | | | | | After ½ hr. at 300° C. | After ½ hr. at 325° C. | | |
| M | CKM1282 | none | 0.5% excess MDA | 25:75 | 308 | 358 | .003 | Borderline |
| N | CKM1634 | " | " | " | 300 | 320 | " | Fail |
| O | CKM1636 | " | " | " | 280 | 310 | .004 | " |
| P | CKM0036 | " | " | " | " | 340 | .003 | Borderline |
| Q | CKM2103 | " | " | " | " | 303 | " | Pass |
| R | CKM1282 | Cymel 301 | " | " | 370 | — | .002 | Fail |
| S | CKM0036 | " | " | " | 310 | — | .004 | " |
| T | CKM2103 | " | " | " | " | 310 | " | " |
| U | CKM1282 | Hexamine | " | " | — | 298 | " | " |
| V | CKM0036 | " | " | " | — | — | .002 | " |
| W | CKM2103 | " | " | " | 285 | — | .003 | " |
| X | CKM2103 | none | " | 15:85 | 273 | — | " | Pass |
| Y | CKM2103 | " | " | 10:90 | 280 | — | " | " |
| Z | CKM2103 | " | " | 5:95 | 275 | — | .002 | " |
| AA | none | " | " | 0:100 | 278 | 315 | .004 | " |

[1]Cymel 301 = hexamethoxymethyl melamine. Hexamine = hexamethylene tetramine. All catalysts were used at 1% level.
[2]Same as Example I, Table 1, Footnote (1). PEAI resins were prepared in tetrahydrofuran to which the phenolic resin, and curing agent if employed, were subsequently added.
[3]Cut-through determined under a 1 kg. load with sample film between crossed 50.8 mil wires.
[4]Dissipation factor measured at 220° C. in 10C oil at 60 Hertz.

EXAMPLE III

A solution of 22.90 g. (0.044 mol) of 2,2-bis[4-(3,4-dicarboxyphenoxy)phenyl] propane dianhydride (4-BPADA) in 200 ml. of tetrahydrofuran (THF) was treated dropwise with 7.93 g. (0.040 mol) of methylene dianiline (MDA) in 100 ml. of THF with stirring. After complete addition and stirring for an additional hour, 10.28 g. of CKM 2103 was added and the THF removed thermally to yield a powder which when cured as a film gave excellent flexibility and a cut-through temperature of 280° C.

Resin powders of the compositions and characteristics of this example having an average particle size of from 5 to 60 microns can be employed in solventless-dry powder fluid bed electrostatic coating and curing of PEAI-phenolic resins onto wire substrates to readily form insulated wire thickness having a continuous film of from 0.5–10 mils (radial thickness) and from 1.0–20 mils (diametric thickness) in wire coating process apparatuses employing fluidized bed electrostatic coating and thermal fusion and curing of the polymer particles at wire speeds of from 1 to 60 feet per minute employing round, rectangular, or strip wire of any thickness. Wire insulation of conventional film thicknesses, prepared accordingly, when tested at suitable voltage differentials for the detection of pinholes (voids in the cured coating which permit the flow of current from an energy source located on the surface of coating through the wire to ground) have the minimum pinhole locations suited to high electrical integrity insulation.

at 230° C. When a melt-drawn film was cured at 300° C. for ½ hour, a cut-through temperature of 305° C. resulted. The results of this detailed example is summarized in Table IV, Run A. The results of other similarly performed Runs, different from Run A with respect to the amount of phenolic resin employed plus a control Run, are also set out in Table IV which follows:

TABLE IV

| Run Nos. | Phenolic Type | BPADA:MPDA[1] PEAI Type | Weight Ratio Phenolic:PEAI | Melt Charater °C. | | |
|---|---|---|---|---|---|---|
| | | | | Sinter | Viscous Flow | Leveling |
| A | CKM 2103 | 3%x's BPADA[2] | 25:75 | 190 | 230 | [3] |
| B | " | " | 15:85 | 195 | >235 | " |
| C | " | " | 5:95 | 225 | >235 | " |
| D | none | " | 0:100 | 225 | >235 | " |

[1]BPADA = same as in Example I, Table I MPDA = m-phenylene diamine having the structural formula:

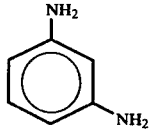

[2]Intrinsic viscosity of the 3% excess BPADA polymer was .040 dl./g. as measured in NMP at 25° C.
[3]Cured before leveling

EXAMPLE V

A solution of 22.90 g. (0.044 mol) of 2,2-bis[4-(3,4-dicarboxyphenoxy)phenyl] propane dianhydride (4-BPADA) in 200 ml. of tetrahydrofuran (THF) was treated dropwise with 7.93 g. (0.04 mol) of methylene dianiline (MDA) in 100 ml. of THF in a one-necked 1-liter round-bottomed flask equipped with magnetic stirrer. After completing the addition of the MDA, the mixture was stirred for an hour, the THF was removed under vacuum and replaced with 600 ml. of a 50/50 mixture of toluene/chlorobenzene mixture. The flask was then equipped with a Dean Stark trap and condensor. The contents of the flask were brought to reflux and the water of imidization removed over a 6-hour period by azeotropic distillation. The toluene was removed by distillation and the chlorobenzene solution was cooled. The polymer was precipitated in four liters of methanol. The resulting PEAI white precipitate, was collected and dried in a vacuum oven at 100° C. and exhibited an I.V. of 0.358 dl./g. as measured in CHCl₃ and 0.375 dl./g. as measured in N-methyl pyrrolidone at 25° C.

7.5 g. of the PEAI polymer was redissolved in methylene chloride and 2.5 g. of CKM 2103 added. The solvent was removed thermally to yield 10 g. of polyimide-phenolic blend. The material sintered at 195° C. and underwent viscous flow at 235° C. When a melt-drawn film was cured at 300° C. for ½ hour, a cut-through temperature of 280° C. resulted.

EXAMPLE VI 80.41 g. (0.1545 mol) of 4-BPADA was placed in a Model 2CV Helicone Mixer made by Atlantic Research Corp. The mixer was heated to 545° F. with stirring and an inert gas passing through the bowl and 16.2 g. (0.15 mol) of m-phenylenediamine was added over the period of 1.5 minutes. After stirring for 60 minutes, the mixture was extruded out to yield a polymer having an I.V. of 0.40 as measured in CHCl₃ at 25° C. Subsequently, the polyetherimide was dissolved in chloroform with 30 g. of CKM 2103 and the solvent was removed thermally to yield 120 g. of polyetherimide phenolic blend. The material sintered at 190° C. and underwent viscous flow In commercial operations, most conveniently blending and heating is carried out on a mixing extruder such as a Werner-Pfleiderer ® Twin-Screw extruder. Alternatively, a Brabender ® mixing bowl or Helicone ® mixer may be employed.

EXAMPLE VII

A solution of 20.82 g. (0.0400 mol) of 2,2-bis[4-(3,4-dicarboxyphenoxy)phenyl] propane dianhydride (4-BPADA) in 200 ml. of tetrahydrofuran (THF) was added dropwise to 9.372 (0.0473 mol) of methylene dianiline (MDA) in 100 ml. of THF in a one-necked 1-liter round-bottomed flask equipped with magnetic stirrer. After completing the addition of the 4-BPADA, the mixture was stirred for an hour, the THF was removed under vacuum and replaced with 600 ml. of a 50/50 mixture of toluene/chlorobenzene mixture. The flask was then equipped with a Dean Stark trap and condensor. The contents of the flask were brought to reflux and the water of imidization removed over a 6-hour period by azeotropic distillation. The toluene was removed by distillation and the chlorobenzene solution was cooled. The polymer was precipitated in four liters of methanol. The resulting PEAI white precipitate was then collected and dried in a vacuum oven at 100° C.

23.1 g. of the PEAI polymer was redissolved in methylene chloride and 5.76 g. of CKM 2103 added. The solvent was removed thermally to yield 28.86 g. of polyimide-phenolic blend. The material sintered at 195° C. and underwent viscous flow at 210° C.

The resulting PEAI-phenolic resin blend was ground in a jet mill and sieved to yield powder with less than 53μ particle size. The powder was coated at 15KV from an electrostatic fluidized bed onto 2 mil aluminum foil and cured for 5 min. at 275° C. The coating was well-fused, with slightly rippled surface. A film having a 2 mil thickness could be bent and creased without cracking, and a 4 mil thickness could be bent around a 50.8 mil mandrel without cracking. Dielectric breakdown for film thickness ranging from 2-3 mils gave an average value of 1.7 KV.

Resin powders of the compositions and characteristics of this example having an average particle size of from 5 to 60 microns can be employed in solventless-dry powder fluid bed electrostatic coating and curing of PEAI-phenolic resins to wire substrates to readily form insulated wire thickness having a continuous film of from 0.5–10 mils (radial thickness) and from 1.0–20 mils (diametric thickness) in wiring coating process apparatuses employing fluidized bed electrostatic coating and thermal curing of the polymer particles at wire speeds of from 1 to 60 feet per minute employing round, rectangular, or strip wire of any thickness. Wire insulation of conventional film thicknesses, prepared accordingly, when tested at suitable voltage differentials for the detection of pinholes (voids in the cured coatings which permit the flow of current from an energy source located on the surface of coating through the wire to ground) have the minimum pinhole locations suited to high electrical integrity insulation.

The powdered particles which can be prepared from the compositions of this invention are particularly adapted for use in electrostatic powder spraying equipment, fluidized resin bed coating processes as well as fluidized resin bed coating processes which employ electrostatic transfer methods for the coating of any article. In general, in a preferred embodiment of this invention, the solventless-dry powder resins are used in a fluidized bed coating process where a wire is passed through the fluidized resin bed containing a bath of fluidized powder having an electric potential different from that of the wire to be coated, such that the charged polymer powder particles are attracted and secured as a uniform layer over the surface of the wire. The uniformly coated wire is thereafter passed into a heating zone where the powdered particles are melted, flow out over the wire and cure to form a smooth and uniform cured film of resin on the wire.

In general, in addition to the above wire insulating processes, the compositions of this invention can also be employed in other wire insulating processes employing other coating processes, e.g. where the wire substrates to be coated is preheated to a temperature within the sintering, viscous flow and leveling temperature of the resin powders causing adherence of the powder particles to the wire with subsequent withdrawal from the coating area, e.g. a fluidized bath, with subsequent passage to a heating zone, e.g. a curing tower, to form a smooth, continuous, uniform film cured wire insulation film over the surface of the wire.

The resin powders of this invention in general have the desired powder characteristics required, i.e. particle size, charge acquisition, charge retention, melt flow, surface tension, wetting properties, which permit powder coating of metallic conductors at temperatures of 20° to 300° C. or even higher, and which on subsequent heating to temperatures above 200° C., e.g. temperatures of from about 250 to 400, provide insulating coatings which meet the thermal, electrical and mechanical insulation requirements for wire coating films, e.g. coating films of from 1 to 30 mils, or even thicker.

Although the preferred use of the compositions of this invention is in solventless-dry powder coating and curing of insulating films on various substrates, it is to be understood that the resin powders can be molded using techniques conventionally employed in molding powdered metals such as by sintering or hot pressing; see for example "Encyclopedia of Chemical Technology" edited by Kirk and Othmer, Interscience Encyclopedia, Inc. 11, pages 54–55, New York (1953). Further, the resin powders of this invention can be employed for any of the uses to which high temperature resistant polyetherimides are used, for example, the resin powders can be molded in the form of bushings, electric insulators, compressor veins and impellers, piston rings, gears, thread guides, cams, brake linings, clutch faces, abrasive articles and the like. The resin powders can be employed also in the casting or spraying of polyetherimide-phenolic films on a variety of substrates such as metal, ceramic, fabrics, polymerics and the like.

Other modifications and variations of the present invention are possible inlight of the above teachings. It is, therefore, to be understood that changes may be made in the particular embodiments of the invention described which are within the full intended scope of the invention as defined by the appended claims.

We claim:

1. A polyetheramide-imide phenolic resin blend comprising a polyetheramide-imide resin and a phenolic resin of the formula, respectively, $$([A]_m[B]_{1-m})_a \text{ and } ([C])_b,$$

wherein A represents a polyamide unit and B represents a polyimide unit of a polyetheramide-imide resin, m represents a mole fraction number greater than or equal to zero, C represents a phenolic resin, a represents a resin blend proportion number greater than zero and less than 1, the sum of a plus b equals 1.0, further wherein said polyamide unit is of the formula:

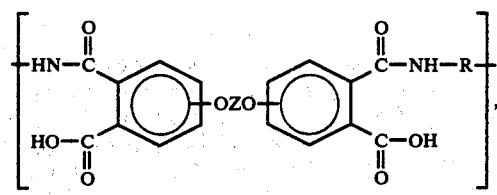

and said polyimide unit is of the formula:

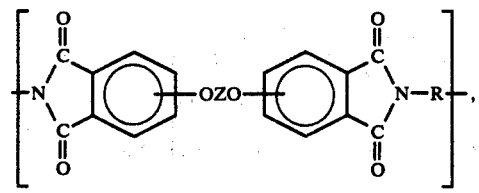

wherein the O—Z—O units of said polyamide or said polyimide units are in the 3 or 3' or 4 or 4' positions and Z is a member of the class consisting of (1)

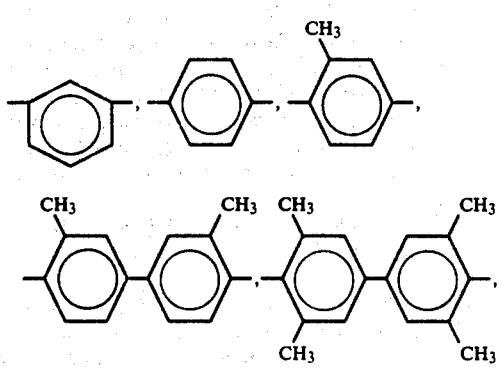

-continued

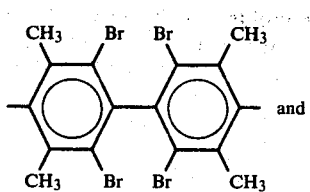
and

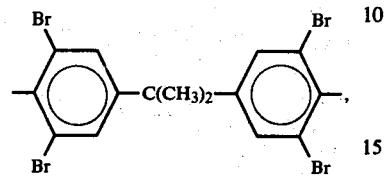

and (2) divalent organic radicals of the general formula

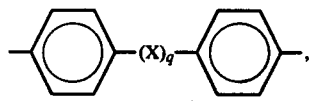

where X is a member selected from the class consisting of divalent radicals of the formulas

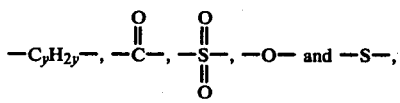

where q is 0 or 1, y is a whole number from 1, to 5, and R is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, $C_{(2-8)}$ alkylene terminated polydiorganosiloxane, and (c) divalent radicals included by the formula

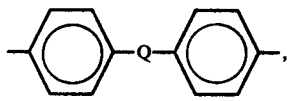

where Q is a member selected from the class consisting of

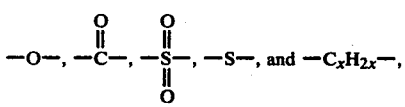

and x is a whole number from 1 to 5 inclusive and further wherein said phenolic resin has an average molecular weight in excess of 125.

2. A solventless-dry powder comprising a polyetheramide-imide phenolic resin blend comprising a polyetheramide-imide resin and a phenolic resin of the formula, respectively,:

$([A]_m[B]_{1-m})_a$ and $([C])_b$
polyetheramide-imide resin    phenolic resin wherein A represents a polyamide unit and B represents a polyimide unit of a polyetheramide-imide resin, m represents a mole fraction number greater than or equal to zero, C represents a phenolic resin, a represents a resin blend proportion number greater than zero and less than 1, the sum of a plus b equals 1.0, further wherein said polyamide unit is of the formula:

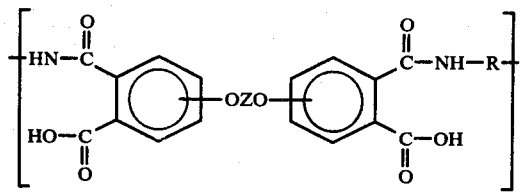

and said polyimide unit is of the formula:

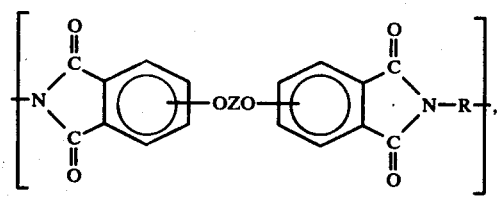

wherein the O—Z—O units of said polyamide or said polyimide units are in the 3 or 3' or 4 or 4' positions and Z is a member of the class consisting of (1)

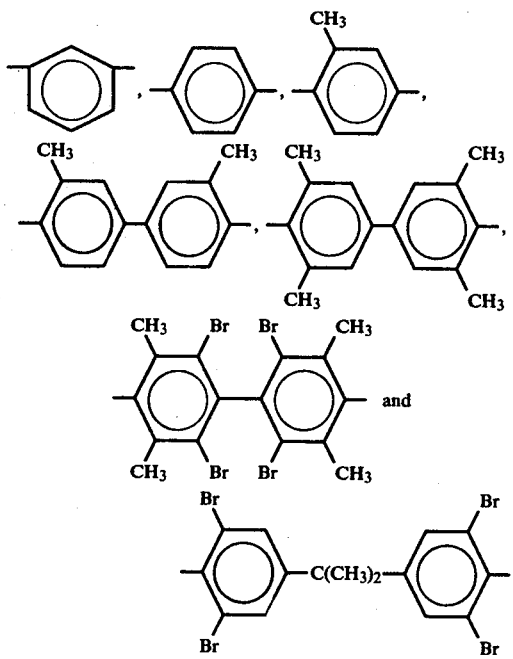

and (2) divalent organic radicals of the general formula

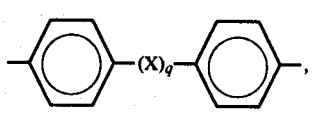

where X is a member selected from the class consisting of divalent radicals of the formulas

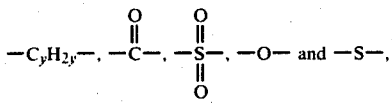

where q is 0 or 1, y is a whole number from 1 to 5, and R is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, $C_{(2-8)}$ alkylene terminated polydiorganosiloxane, and (c) divalent radicals included by the formula

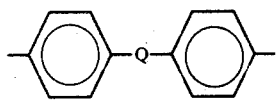

where Q is a member selected from the class consisting of

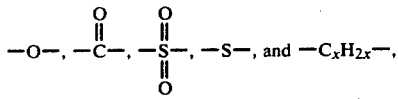

and x is a whole number from 1 to 5 inclusive and further wherein said phenolic resin has an average molecular weight in excess of 125.

3. A solventless-dry powder of the composition of claim 2, wherein the powder particles have a diameter within the range of from about 5 to about 200 microns, a sintering temperature range (STR) of from about 75° to about 200° C., a viscous flow temperature range (VFTR) of from about 75° to about 240° C., and a leveling temperature range (LTR) of from about 160° to 280° C.

4. A solventless-dry powder of the composition of claim 3, wherein the phenolic resin has an average molecular weight within the range of from about 350 to 1,000.

5. A solventless-dry powder coating of the composition of claim 4, wherein the powder particles have a diameter of from about 5 to about 60 microns, a "STR" of 140° to 190° C., a "VFTR" of 155° to 220° C., and a "LTR" of from 200° to 250° C.

6. A solventless-dry powder of the composition of claim 4, wherein the phenolic resin has a melting point range of from about 40° to about 180° C.

7. A solventless-dry powder of the composition of claim 2, wherein a is at least equal to the number 0.5.

8. A claim 2 composition, wherein said phenolic resin is an oil soluble thermoplastic phenolic resin.

9. A claim 8 composition, wherein said resin is a substantially linear phenolic resin having an average molecular weight of about 350-1000.

10. The claim 9 composition wherein said resin has a melting point range of from about 40° C. to about 200° C.

11. The claim 10 composition, wherein said melting point range is from 60° C. to 125° C.

12. The claim 11 composition, wherein said resins re substantially prepared from phenols having tertiary acyclic or cyclic hydrocarbon para substituents.

13. The claim 12 composition, wherein said substituents are $C_{4-30}$ tertiary alkyl or alkylene radicals.

14. The claim 13 compositions, wherein said radicals are tertiary butyl radicals.

15. The claim 12 compositions, wherein "a" represents a resin blend proportion number equal to or greater than 0.75.

16. The claim 15 composition, wherein the —O—Z—O— units of said polyamide or said polyimide units are situated in the 3,3'-, 3,4'-, 4,3'- or the 4,4'-positions and Z is the divalent radical of the general formula

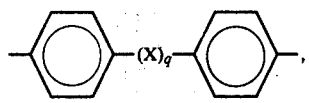

where X is a divalent radical of the formula

where y is a whole number of from 1 to 5.

17. A claim 1 composition wherein the polyetheramide-imide resin is a reaction product of (i) an aromatic bis(ether anhydride) of the formula

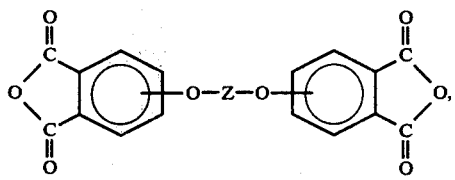

where Z is as defined hereinbefore and (ii) a diamino compound of the formula

where R is as previously defined.

18. A claim 17 composition wherein the anhydride is 2,2-bis[4-(2,3-dicarboxyphenoxy)phenyl]propane dianhydride and the diamino compound is m-phenylene diamine.

19. A claim 17 composition wherein the anhydride is 2,2-bis[4-(2,3-dicarboxyphenoxy)phenyl]propane dianhydride and the diamino compound is p-phenylenediamine.

20. A claim 17 composition wherein the anhydride is 2,2-bis[4-(2,3-dicarboxyphenoxy)phenyl]propane dianhydride and the diamino compound is 4,4'-diaminodiphenylmethane.

* * * * *